United States Patent
Kim et al.

(10) Patent No.: US 8,246,894 B2
(45) Date of Patent: Aug. 21, 2012

(54) FLEXIBLE SUBSTRATE, METHOD OF MANUFACTURING DISPLAY SUBSTRATE, AND METHOD OF MANUFACTURING DISPLAY PANEL

(75) Inventors: Myung-Hwan Kim, Yongin-si (KR); Nam-Seok Roh, Seongnam-si (KR); Sang-Il Kim, Yongin-si (KR); Woo-Jae Lee, Yongin-si (KR); Jung-Hun Noh, Yongin-si (KR)

(73) Assignee: Samsung Electronics, Ltd., Suwon-Si, Gyeonggi-Do (KR)

( * ) Notice: Subject to any disclaimer, the term of this patent is extended or adjusted under 35 U.S.C. 154(b) by 649 days.

(21) Appl. No.: 12/410,149

(22) Filed: Mar. 24, 2009

(65) Prior Publication Data

US 2010/0028656 A1    Feb. 4, 2010

(30) Foreign Application Priority Data

Jul. 29, 2008 (KR) ........................ 10-2008-0074234

(51) Int. Cl.
*D06M 10/00* (2006.01)
*H01J 9/24* (2006.01)
*H01L 21/84* (2006.01)
*H05B 7/00* (2006.01)

(52) U.S. Cl. ........ 264/465; 29/592.1; 264/104; 264/129; 264/255; 264/639; 438/30; 438/107; 438/149

(58) Field of Classification Search .................. 264/104, 264/129, 255, 465, 639; 29/592.1; 438/30, 438/107, 149
See application file for complete search history.

(56) References Cited

FOREIGN PATENT DOCUMENTS

| JP | 2006-036926 | 2/2006 |
|----|-------------|--------|
| JP | 2007-083467 | 4/2007 |
| KR | 1020050075407 | 7/2005 |

*Primary Examiner* — Leo B Tentoni
(74) *Attorney, Agent, or Firm* — F. Chau & Associates, LLC.

(57) ABSTRACT

A flexible substrate, a method of manufacturing a display substrate, and a method of manufacturing a display panel. A spinning device is filled with a source solution, and a carrier substrate is arranged such that the spinning device faces the carrier substrate. An electric field is formed between the spinning device and the carrier substrate by supplying a power to the spinning device and the carrier substrate, and a nano-fiber is formed by spraying the source solution toward the carrier substrate. A flexible substrate is formed on the carrier substrate by coating a polymer resin on the nano-fiber, a plurality of display cells are formed on the flexible substrate, and then a display substrate is formed by separating the carrier substrate from the flexible substrate.

23 Claims, 19 Drawing Sheets

FLEXIBLE SUBSTRATE, METHOD OF MANUFACTURING DISPLAY SUBSTRATE, AND METHOD OF MANUFACTURING DISPLAY PANEL

CROSS-REFERENCE TO RELATED APPLICATION

This application claims priority to Korean Patent Application No. 2008-74234 filed on Jul. 29, 2008, the contents of which are herein incorporated by reference in their entirety.

BACKGROUND

1. Technical Field

The present invention relates to a flexible substrate, and, more particularly, to a flexible substrate manufactured through an electrospinning scheme, a method of manufacturing a display substrate, and a method of manufacturing a display panel.

2. Discussion of the Related Art

Display apparatuses have been manufactured to be thin and lightweight while improving performance to output various types of information. Such a display apparatus employs a lightweight flexible substrate having superior portability. The flexible substrate is thin and light, and is durable against external impact. However, since the flexible substrate has a thin and lightweight structure handling the flexible substrate must be done with extra care and can be difficult.

When manufacturing the display apparatus, to facilitate handling of the flexible substrate, the flexible substrate is coupled with a carrier substrate. The flexible substrate, which is coupled with the carrier substrate, is subject to manufacturing processes, including forming thin film transistors and color filters thereon. As a result, the flexible substrate is extended by heat while various processes are performed.

SUMMARY

An exemplary embodiment of the present invention includes a method of manufacturing a display substrate by forming a flexible substrate on a carrier substrate through an electrospinning scheme.

An exemplary embodiment of the present invention includes a method of manufacturing a display panel by using a flexible substrate formed on a carrier substrate through an electrospinning scheme.

An exemplary embodiment of the present invention includes providing a flexible substrate formed through a method of manufacturing a display substrate.

According to an exemplary embodiment of the present invention, a method of manufacturing a display substrate is performed as follows. First, a spinning device is filled with a source solution, and a carrier substrate is arranged such that the spinning device faces the carrier substrate. Then, an electric field is formed between the spinning device and the carrier substrate by supplying a power to the spinning device and the carrier substrate, and a nano-fiber is formed by spraying the source solution toward the carrier substrate. Thereafter, a flexible substrate is formed on the carrier substrate by coating a polymer resin on the nano-fiber, a plurality of display cells are formed on the flexible substrate, and then a display substrate is formed by separating the carrier substrate from the flexible substrate.

An adhesive layer may be further formed on the carrier substrate.

The nano-fiber may have a shape of a cubic net. In addition, the power supplied to the spinning device may have a voltage level of about 1 KV to about one-hundred thousand KV, and the carrier substrate may have a ground voltage level.

The source solution may be a polymer solution including one of nylon, polyimide, aramide, and polyester.

After forming the nano-fiber, the nano-fiber may be cured by heating the nano-fiber.

The source solution may include one of silicon oxide (SiOx) and titanium oxide (TiOx), and may have one of sol and gel states.

After forming the nano-fiber, the nano-fiber may be sintered by heating the nano-fiber, and a surface of the nano-fiber may be treated using siloxane.

In an exemplary embodiment of the present invention, a method of manufacturing a display substrate is performed as follows. A spinning device is filled with a source solution, and a roller is disposed such that the roller faces the spinning device. Then, after generating an electric field between the spinning device and the roller by supplying power to the spinning device and the roller, a nano-fiber is formed by rotating the roller and spraying the source solution toward the rotating roller. Thereafter, a flexible substrate is formed on the roller by allowing the nano-fiber to penetrate into polymer resin, and the flexible substrate is separated from the roller. Subsequently, the flexible substrate is coupled with a carrier substrate to fix the flexible substrate, a plurality of display cells are formed on the flexible substrate, and then a display substrate is formed by separating the carrier substrate from the flexible substrate.

In an exemplary embodiment of the present invention, a method of manufacturing a display panel is performed as follows. First and second substrates are bonded with carrier substrates, respectively. Then, a plurality of thin film transistors and a plurality of color filters are formed on the first and second substrates, respectively, and the first substrate is coupled with the second substrate while interposing liquid crystal between the first and second substrates. The preparing of the first or second substrate is performed as follows. A spinning device is filled with a source solution, and a carrier substrate is arranged such that the spinning device faces the carrier substrate. Next, an electric field is formed between the spinning device and the carrier substrate by supplying a power to the spinning device and the carrier substrate, and a nano-fiber is formed by spraying the source solution toward the carrier substrate. Thereafter, a flexible substrate is formed on the carrier substrate by coating a polymer resin on the nano-fiber.

The flexible substrate includes metal compound. The flexible substrate includes fibers which include metal compound, and have a nano-sized diameter and a shape of a cubic net. Polymer resin fills in a space between the fibers.

According to the embodiments of the present invention, the flexible substrate can be formed on the carrier substrate through an electrospinning scheme. When performing the subsequent processes for the flexible substrate, a process to bond the carrier substrate with the flexible substrate can be omitted. In addition, the extension of the flexible substrate caused by heat can be prevented.

In addition, the flexible substrate can be formed on the carrier substrate through an electrospinning scheme to form the display substrate, and the display panel can be manufactured by using the display substrate. Accordingly, a process to bond the carrier substrate with the flexible substrate can be omitted, so that a manufacturing cost can be reduced.

BRIEF DESCRIPTION OF THE DRAWINGS

Exemplary embodiments of the present invention will become readily apparent by reference to the following detailed description when considered in conjunction with the accompanying drawings wherein.

DESCRIPTION OF THE EMBODIMENTS

Figure 1:
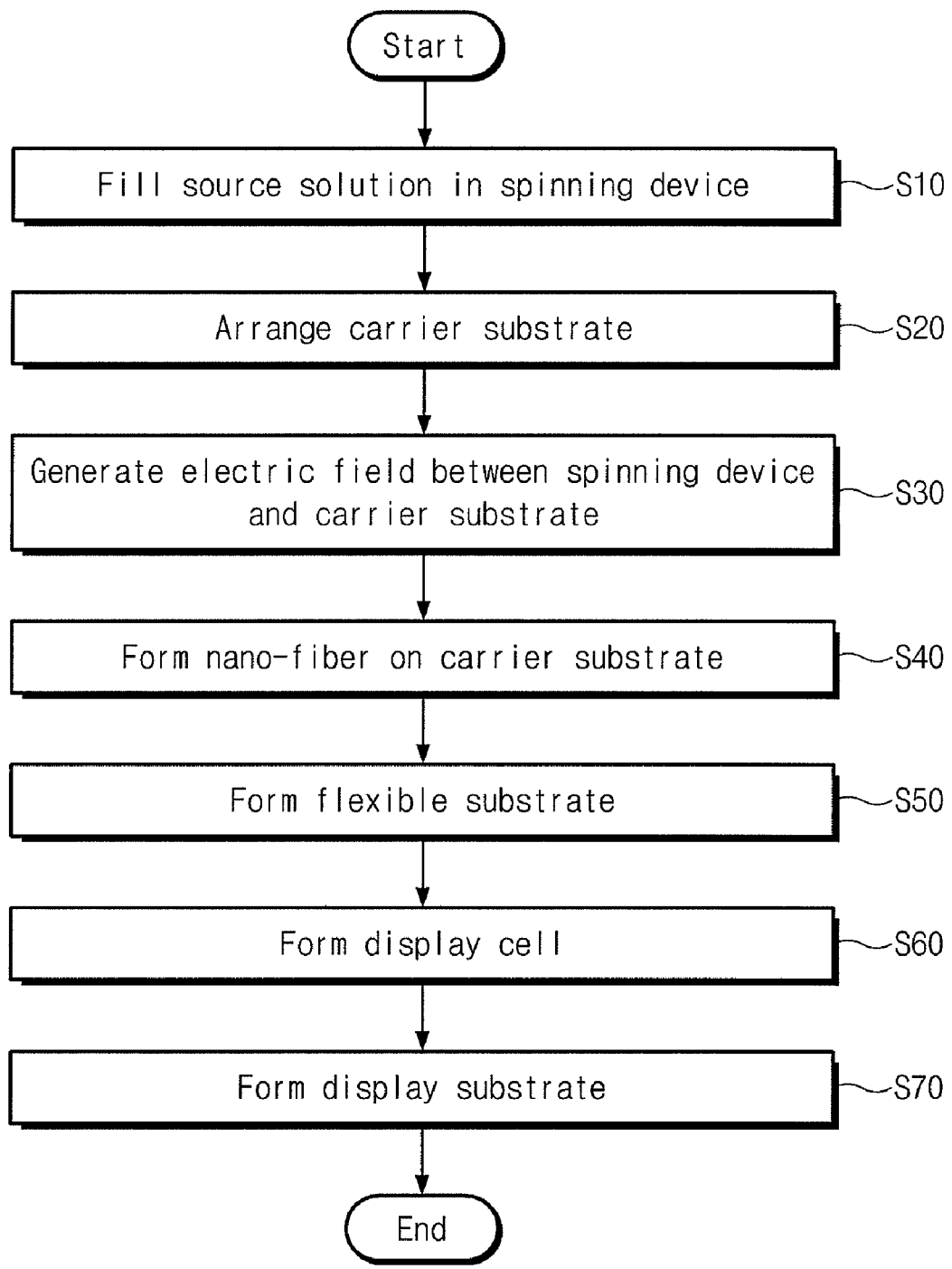
FIG. 1 is a flowchart illustrating a method of manufacturing a display substrate according to an exemplary embodiment of the present invention.

Hereinafter, exemplary embodiments of the present invention will be described in further detail with reference to accompanying drawings. It is to be understood that the present invention should not be limited to the following exemplary embodiments but various changes and modifications can be made by one with ordinary skill in the art within the spirit and scope of the present invention. The same reference numerals may be used to designate the same or similar elements throughout the drawings.

Figure 2:
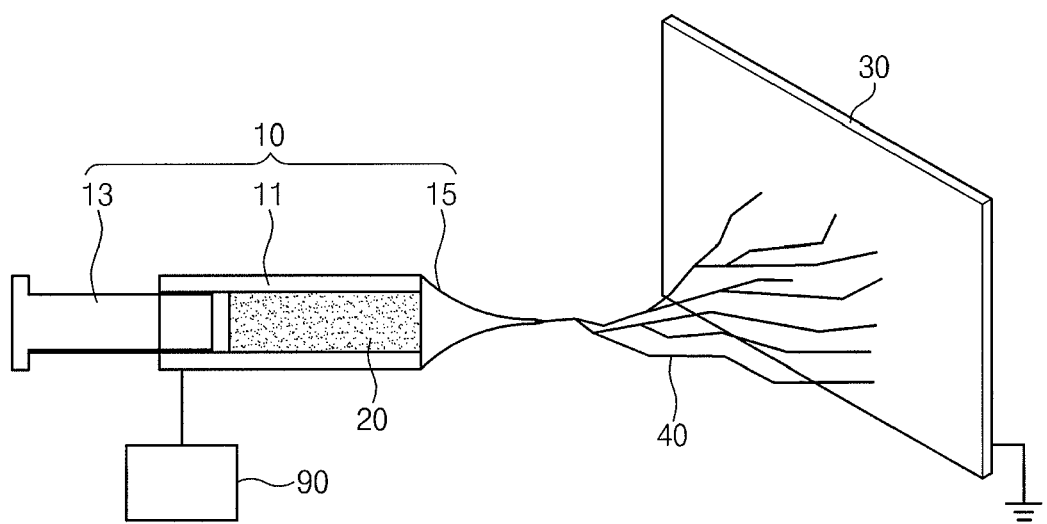
FIG. 2 is a side view showing a spinning device and a carrier substrate of FIG. 1, according to an exemplary embodiment of the present invention.
Figure 3:
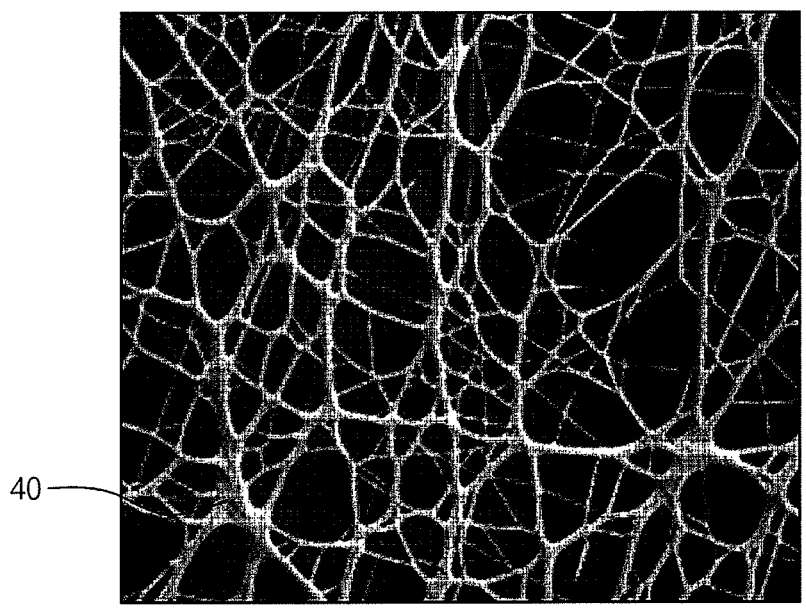
FIG. 3 is an enlarged view of a portion of nano-fibers shown in FIG. 2.

FIG. 1 is a flowchart illustrating a method of manufacturing the display substrate according to an exemplary embodiment of the present invention, and FIG. 2 is a side view showing a spinning device and a carrier substrate of FIG. 1, according to an exemplary embodiment of the present invention. FIG. 3 is an enlarged view of a portion of nano-fibers shown in FIG. 2, and FIGS. 4 to 7 are perspective views and sectional views showing the method of manufacturing the display substrate shown in FIG. 1, according to an exemplary embodiment of the present invention.

Referring to FIGS. 1 and 2, a spinning device 10 is filled with a source solution 20 (step S10). In detail, the spinning device 10 including a syringe 11, a pressing unit 13, and a nozzle 15 is provided. The syringe 11 is filled with the source solution 20, the pressing unit 13 is coupled with one end of the syringe 11 to press the source solution 20, and the nozzle 15 is coupled with the other end of the syringe 11 to spray the source solution 20. Although not shown in FIGS. 1 and 2, at least one spinning device may be provided.

The source solution 20 may include polymer solution including nylon, polyimide, aramide, or polyester. In addition, the source solution 20 may include dispersion solution including a metal oxide group consisting of silicon oxide (SiOx) or titanium oxide (TiOx). The dispersion solution may have sol or gel states.

A carrier substrate 30 is arranged to face the spinning device 10 (step S20). The carrier substrate 30 is spaced apart from the spinning device 10 by a predetermined distance such that a surface of the carrier substrate 30 faces the spinning device 10. The carrier substrate 30 may include glass to prevent a target to be bonded with the carrier substrate 30 from extending due to heat.

Figure 4:
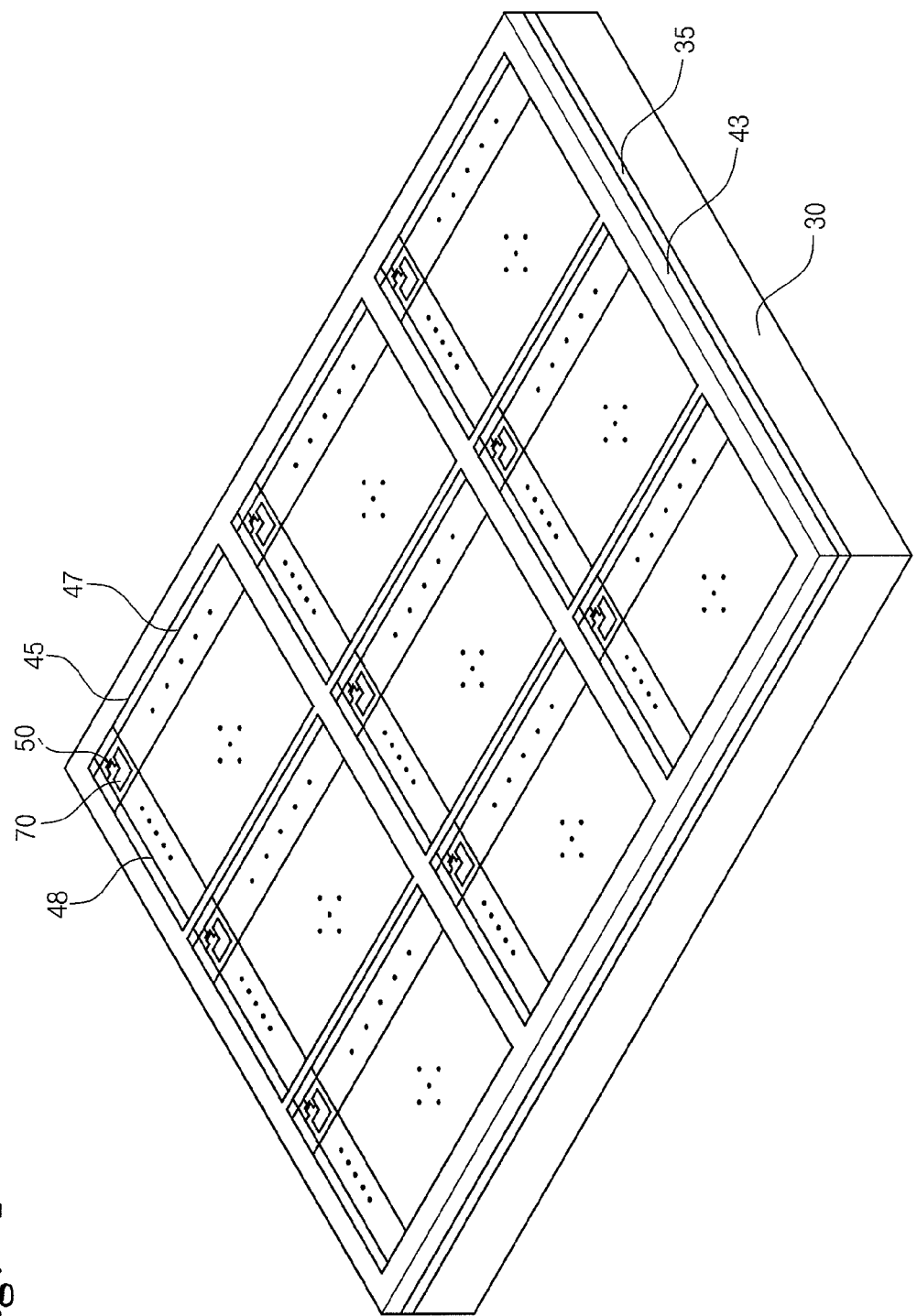
FIGS. 4 to 7 are perspective views and sectional views showing the method of manufacturing the display substrate shown in FIG. 1, according to an exemplary embodiment of the present invention.
Figure 5:
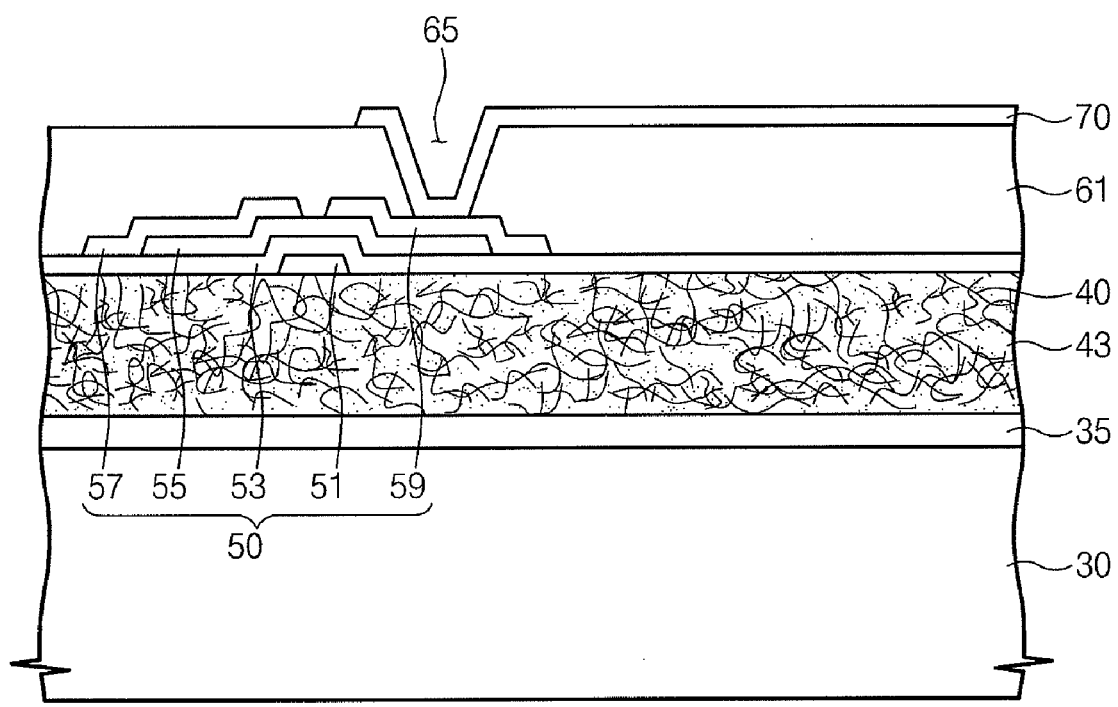

Before the carrier substrate 30 is arranged, an adhesive layer 35 may be formed on the surface of the carrier substrate 30. The adhesive layer 35 is shown in FIGS. 4 to 5. For example, the adhesive layer 35 may be formed by coating an adhesive material on the carrier substrate 30 through a printing scheme, a slit coating scheme, a spin coating scheme, a dipping scheme, etc. The adhesive layer 35 may include epoxy, acrylate, etc. The adhesive layer 35 may include a transparent and/or a heat curable adhesive. According to an embodiment of the present invention, the adhesive layer 35 has a light transmittance of about 20% or more and a heat resistance to the temperature of about 50° C. or above with respect to an area of about 400 nm. Meanwhile, the adhesive layer 35 may be formed by laminating an adhesive, such as a double-sided adhesive tape, on the surface of the carrier substrate 30.

An electric field is generated between the spinning device 10 and the carrier substrate 30 (step S30). The electric field may be generated by supplying a power to the spinning device 10 and the carrier substrate 30 and using potential difference generated between the spinning device 10 and the carrier substrate 30. For example, a power of about 1 KV to about one-hundred thousand KV is supplied to the spinning device 10 through a power supply 90, and a line is connected to the carrier substrate 30, so that the carrier substrate 30 is grounded. Various levels of power are supplied to the spinning device 10 according to a distance between the spinning device 10 and the carrier substrate 30. Accordingly, the source solution 20 filled in the syringe 11 may be electrified by the potential difference.

Thereafter, nano-fibers 40 are formed by spraying the source solution 20 onto the carrier substrate 30 (step S40). In this case, the nano-fibers 40 may be formed through an electrospinning scheme. In more detail, the source solution 20 that is electrified is pressed by moving the pressing unit 13 into the syringe 11. The source solution 20 is discharged through the nozzle 15. The source solution 20 is sprayed by the electric field on one surface of the carrier substrate 30, thereby forming the nano-fibers 40 having a net-like shape. The nano-fibers 40 may be formed in the net-like shape on the adhesive layer 35.

Referring to FIG. 3, the nano-fibers 40 have a cubic structure through the electrospinning scheme. For example, each of the nano-fibers 40 has a diameter of about 200 nm or less, and the nano-fibers 40 have a cubic net structure. Accordingly, the nano-fibers 40 are easily recognized, and are prevented from being extended by heat.

In this case, if the nano-fibers 40 include the polymer solution, the nano-fibers 40 may be cured by applying heat to the nano-fibers 40. If the nano-fibers 40 include the metal oxide group, the nano-fibers 40 may be sintered by heating the nano-fibers 40, and then the surface of the nano-fibers 40 may be treated using siloxane. The siloxane is used to bond the nano-fibers 40 with polymer resin.

Next, a flexible substrate 43 (see FIG. 4) is formed by coating the nano-fibers 40 with polymer resin (step S50). More specifically, the polymer resin is uniformly coated on the nano-fibers 40 having the net-like shape. The polymer resin penetrates into the spaces between the nano-fibers 40 such that the polymer resin is bonded with the nano-fibers 40. In addition, the nano-fibers 40 may be infused into the polymer resin. Then, the polymer resin is cured to form the flexible substrate 43. The polymer resin may include a transparent material or an opaque material depending on the intended use of the flexible substrate 43. For example, the polymer resin may include a transparent material including an epoxy-based material or an acrylic-based material. The polymer resin may include an opaque material including polyimide, polyethylene naphthalate, poly methyl metacrylate, or polycarbonate.

The flexible substrate 43 has a surface step difference suitable for a display substrate. For example, the flexible substrate 43 may have a surface step difference in a range of about 0.5 µm to about 1.0 µm. In addition, since the flexible substrate 43 includes the nano-fibers 40 having a cubic net structure, thermal expansion of the polymer resin may be reduced.

Thereafter, a plurality of display cells 45 are formed on the flexible substrate 43 (step S60). As shown in FIGS. 4 and 5, the display cell 45 may include a thin film transistor 50 connected to a gate line 47 and a data line 48, and a pixel electrode 70 connected to the thin film transistor 50. The thin film transistor 50 includes a gate electrode 51, an insulating layer 53, a semiconductor layer 55, a source electrode 57, and a drain electrode 59. A process of forming the thin film transistor 50 will be described. After depositing a gate metal on the flexible substrate 43, the resultant structure is patterned, thereby forming the gate electrode 51. Then, the insulating layer 53 is formed on the flexible substrate 43 and the gate electrode 51. Subsequently, after depositing a semiconductor material on the insulating layer 53, the resultant structure is patterned, thereby forming the semiconductor layer 55 overlapping with the gate electrode 51. Next, a data metal is deposited on the insulating layer 53 and the semiconductor layer 55, and then the resultant structure is patterned. Accordingly, the source electrode 57, which makes contact with the semiconductor layer 55, and the drain electrode 59, which makes contact with the semiconductor layer 55 while being spaced apart from the source electrode 57, are formed.

The pixel electrode 70 is formed on a protective layer 61. The protective layer 61 protects the thin film transistor 50. A contact hole 65 is formed in the protective layer 61, so that the pixel electrode 70 is connected to the drain electrode 59.

Figure 6:
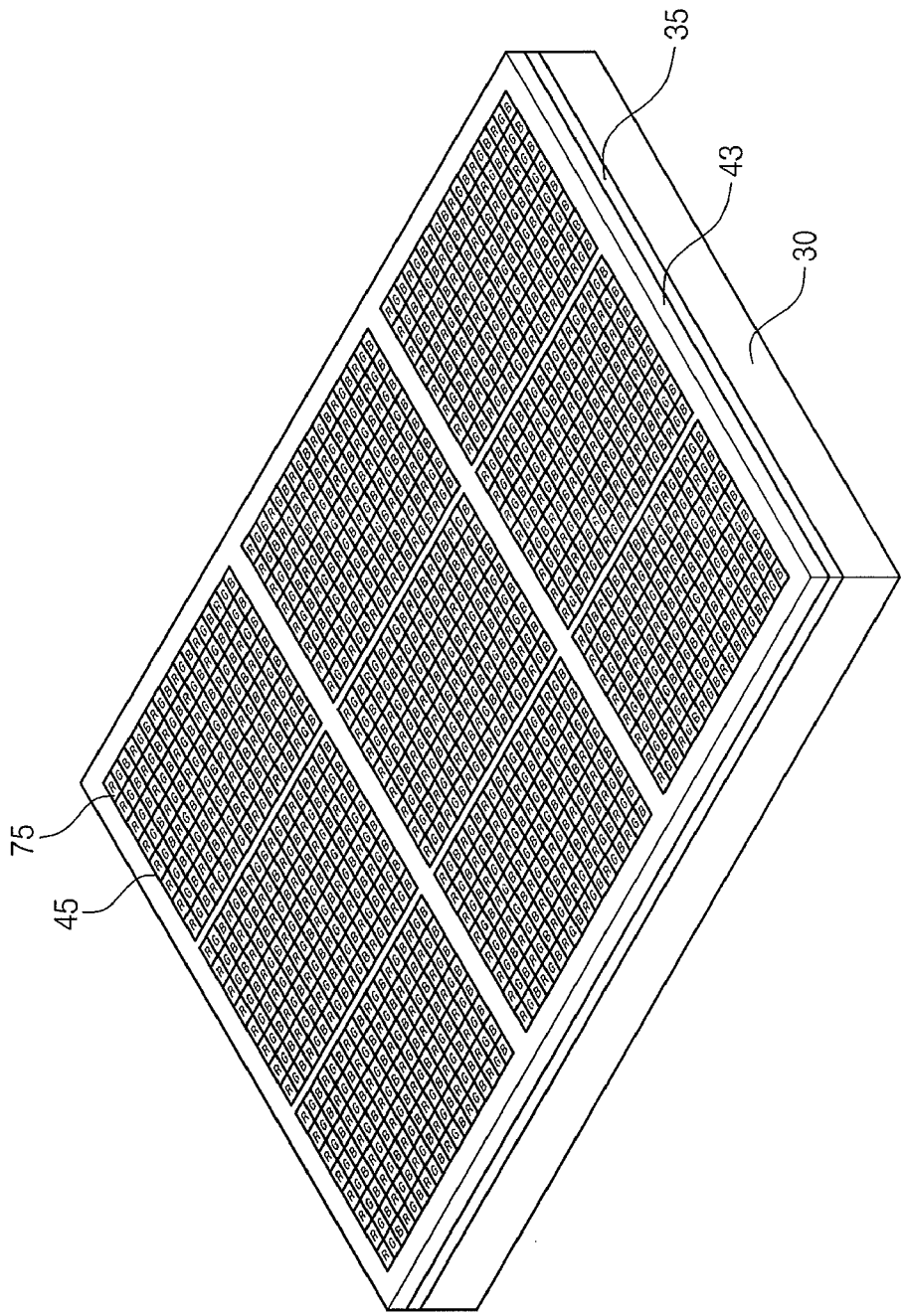
Figure 7:
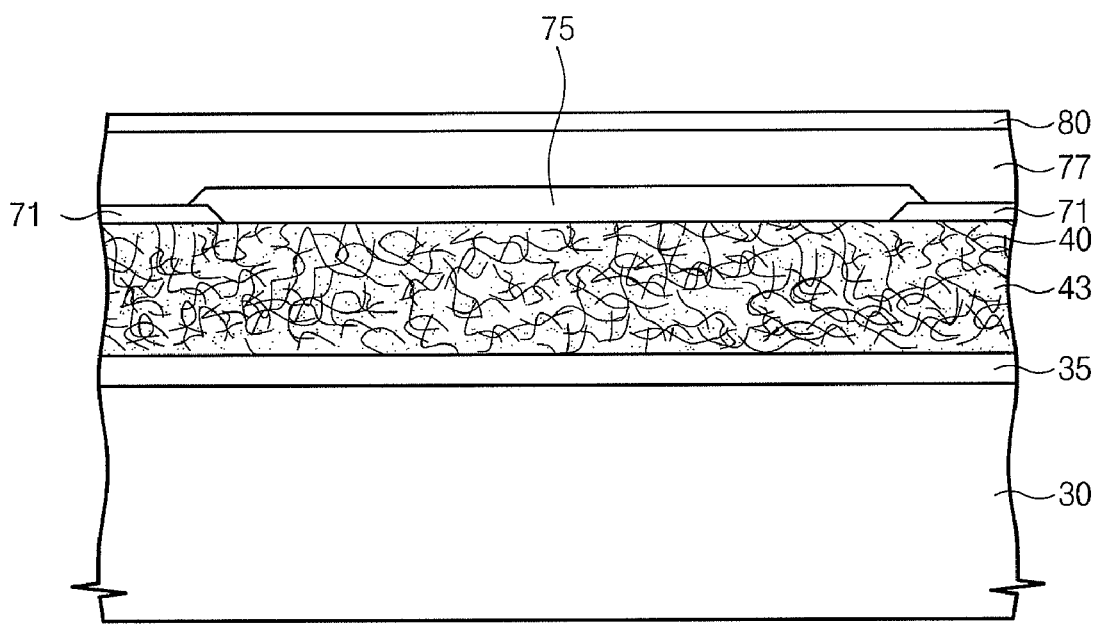

As shown in FIGS. 6 and 7, the display cell 45 may include a plurality of color filters 75 and a common electrode 80. The color filters 75 include an organic material for the display of red (R), green (G), and blue (B) colors. The color filters 75 are formed between black matrices 71 on the flexible substrate 43. A planar layer 77 is formed on the color filters 75 and the black matrices 71 to reduce a step coverage of the color filters 75 and the black matrices 71. The common electrode 80 is formed on the planar layer 77.

Next, the carrier substrate 30 is separated from the flexible substrate 43 formed with the display cells 45, thereby forming the display substrate (step S70). The carrier substrate 30 may be separated from the flexible substrate 43 by using a laser. The adhesive layer 35 bonded with the flexible substrate 43 is removed by the laser, so that the carrier substrate 30 may be separated from the flexible substrate 43. Finally, the display cells 45 are divided into each other to form a unit display substrate. According to an embodiment, the display cells 45 may be divided into each other to form the unit display substrate before the carrier substrate 30 is separated from the flexible substrate 43.

A method of manufacturing a display substrate according to an exemplary embodiment of the present invention will be described with reference to FIGS. 8 and 9.

Figure 8:
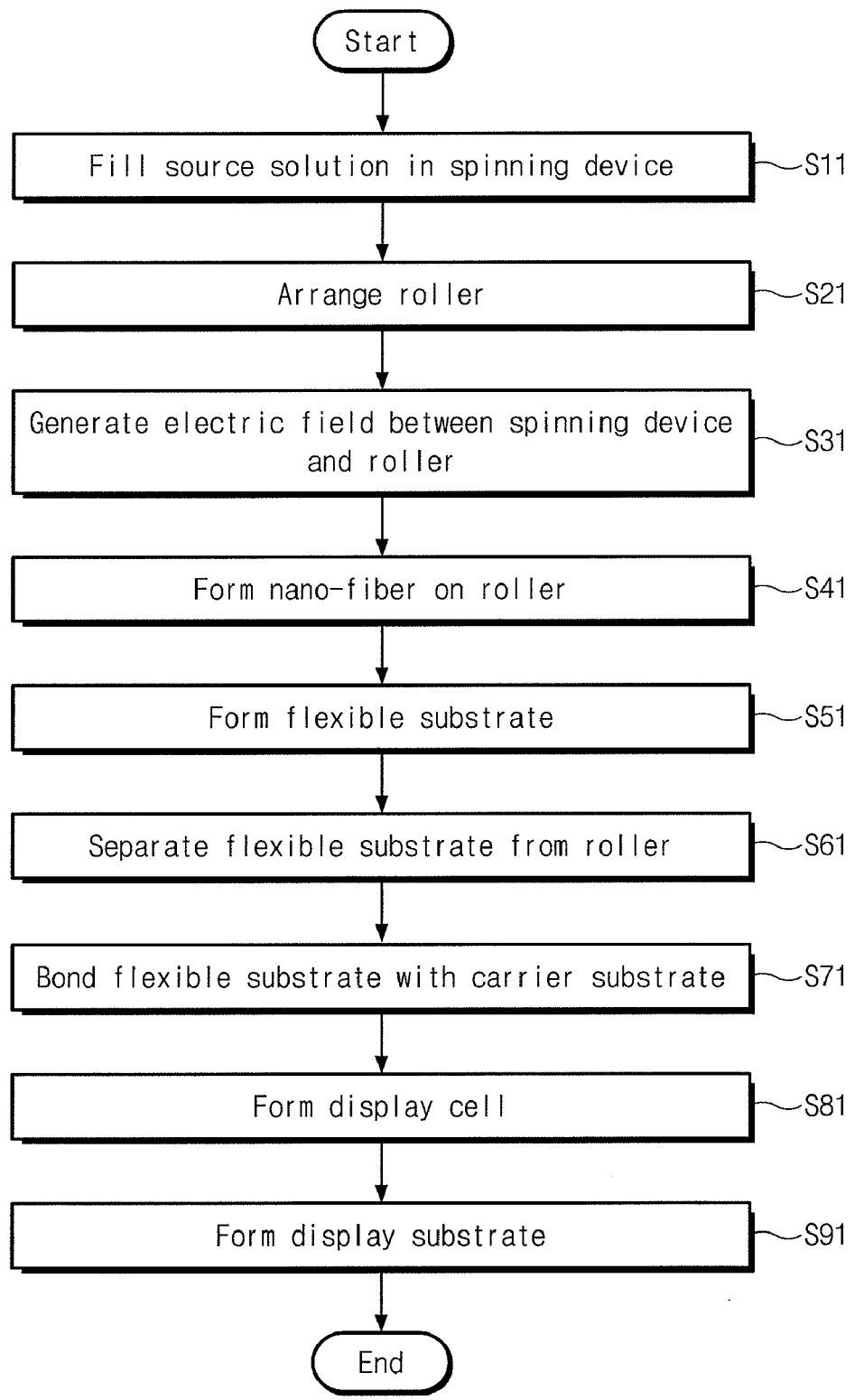
FIG. 8 is a flowchart illustrating a method of manufacturing a display substrate according to an exemplary embodiment of the present invention.
Figure 9:
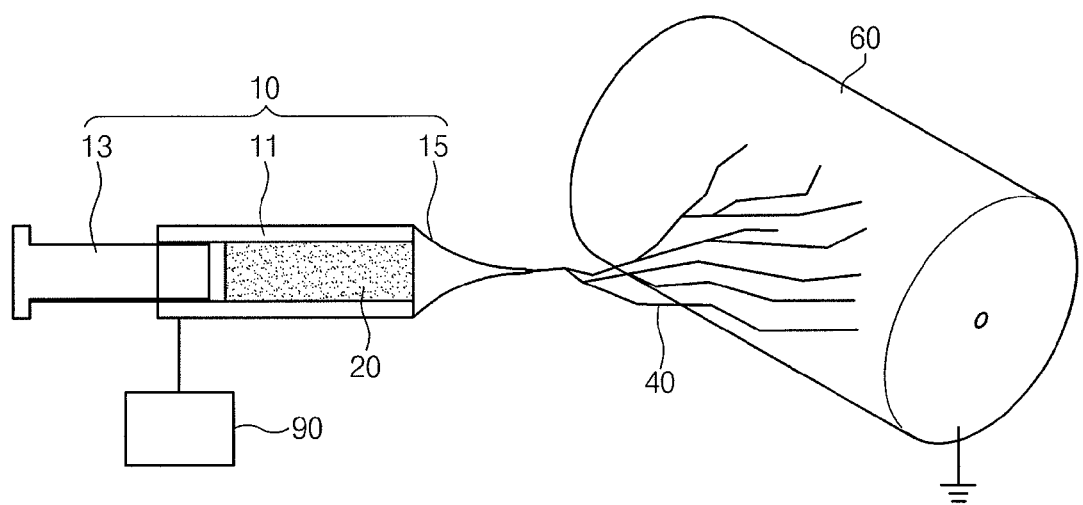
FIG. 9 is a side view showing a spinning device and a roller of FIG. 8, according to an exemplary embodiment of the present invention.

FIG. 8 is a flowchart illustrating a method of manufacturing the display substrate according to an exemplary embodiment of the present invention, and FIG. 9 is a side view showing a spinning device and a roller of FIG. 8. Referring to FIGS. 8 and 9, the spinning device 10 is filled with the source solution 20 (step S11).

Then, a roller 60 is arranged to face the spinning device 10 (step S21). The roller 60 is spaced apart from the spinning device 10 by a predetermined distance.

Thereafter, an electric field is generated between the spinning device 10 and the roller 60 (step S31). The electric field may be generated by supplying power to the spinning device 10 and the roller 60 and using potential difference between the spinning device 10 and the roller 60. For example, power of about 1 KV to about one-hundred thousand KV may be supplied to the spinning device 10 through the power supply 90, and the roller 60 may be grounded. Various levels of power are supplied to the spinning device 10 depending on the distance between the spinning device 10 and the roller 60. Accordingly, the source solution 20 filled in the syringe 11 may be electrified by the potential difference.

Thereafter, the source solution 20 is sprayed onto the roller 60 to form the nano-fibers 40 (step S41). The roller 60 is rotated, and the source solution 20 is sprayed onto the roller 60 through an electrospinning scheme, so that the nano-fibers 40 having a net-like shape are formed.

Then, the nano-fibers 40 penetrate into polymer resin to form a flexible substrate (step S51). The nano-fibers 40 uniformly penetrate into the polymer resin by rotating the roller 60. The polymer resin is infused into the spaces between the nano-fibers 40, so that the polymer resin is bonded with the nano-fibers 40. In addition, the nano-fibers 40 may be coated with the polymer resin. Then, the polymer resin may be cured to form the flexible substrate.

Thereafter, the flexible substrate is separated from the roller 60 (step S61).

Then, the flexible substrate is bonded with a carrier substrate (step S71). After a pressure-sensitive adhesion or coating an adhesive on the flexible substrate, the flexible substrate and the carrier substrate are aligned, so that the flexible substrate is bonded with the carrier substrate.

Subsequently, a plurality of display cells are formed on the flexible substrate (step S81).

The carrier substrate is separated from the flexible substrate formed with the display cells, thereby forming the display substrate (step S91). Finally, the display cells are divided into each other to form a unit display substrate. According to an exemplary embodiment, the display cells may be divided into each other before the carrier substrate is separated from the flexible substrate.

A method of manufacturing a display panel according to an exemplar embodiment of the present invention will be described with reference to FIGS. 10 to 23.

Figure 10:
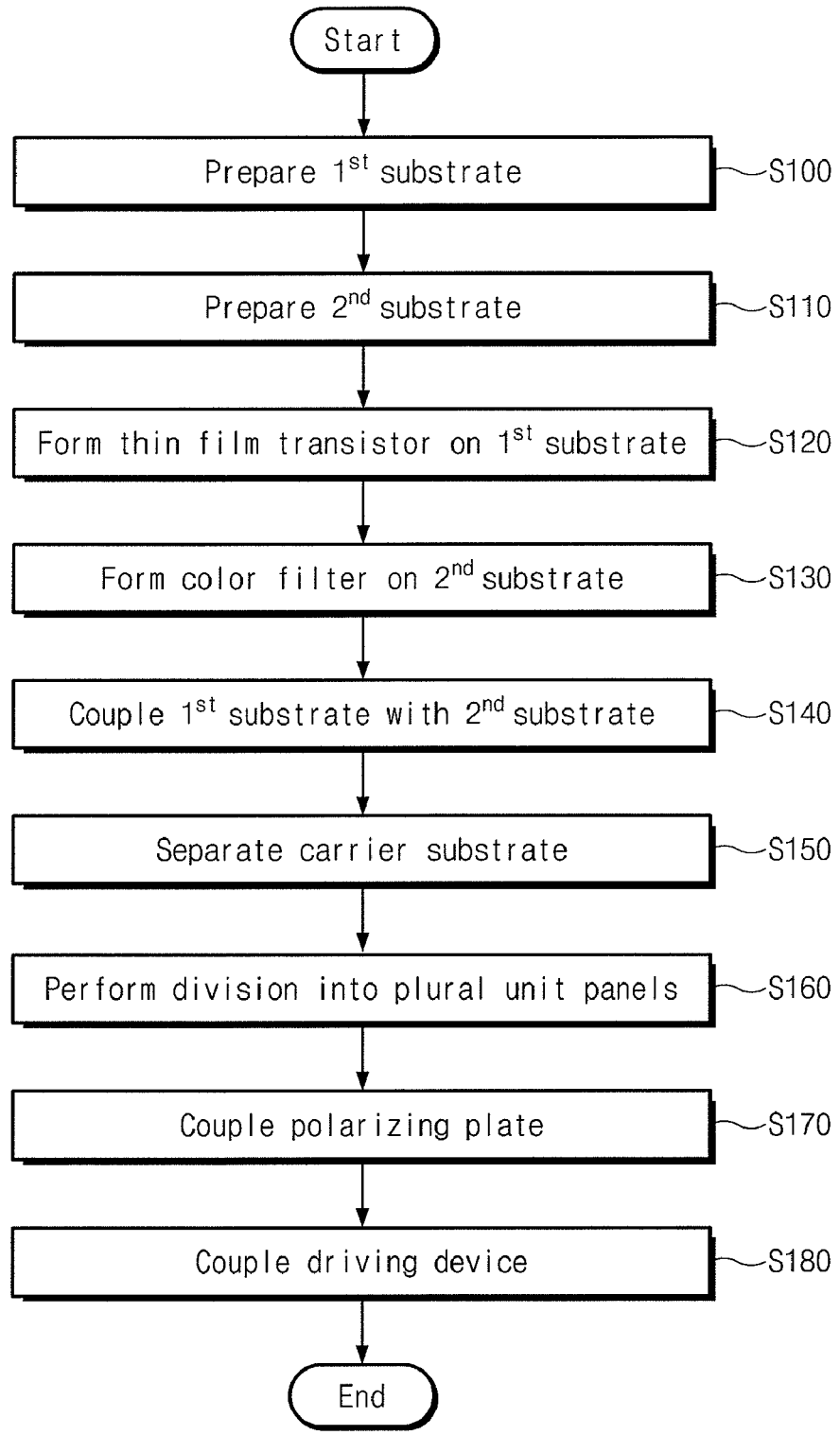
FIG. 10 is a flowchart illustrating a method of manufacturing a display panel according to an exemplary embodiment of the present invention.
Figure 11:
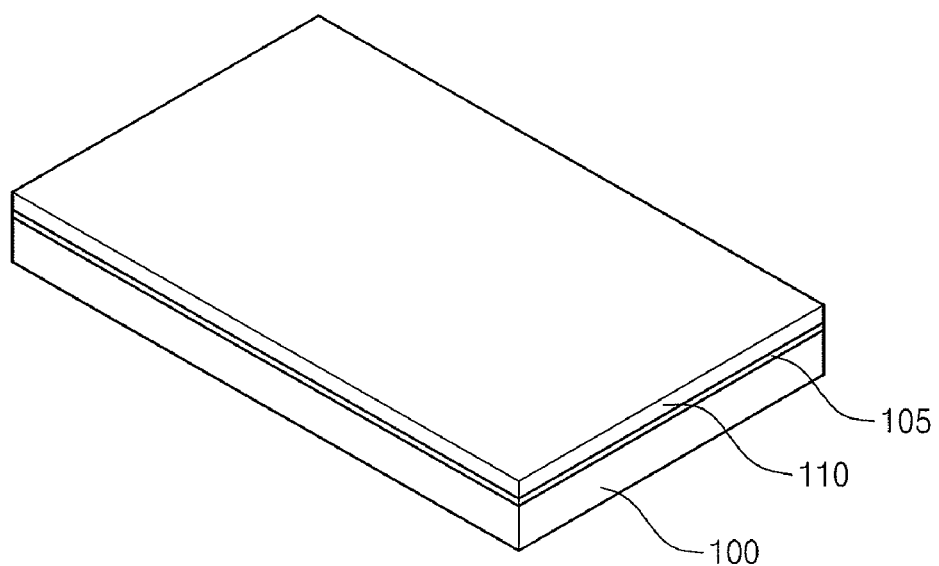
FIGS. 11 to 23 are perspective views and sectional views showing the method of manufacturing the display panel of FIG. 10, according to an exemplary embodiment of the present invention.

FIG. 10 is a flowchart illustrating a method of manufacturing the display panel according to an exemplary embodiment of the present invention, and FIGS. 11 to 23 are perspective views and sectional views showing the method of manufacturing the display panel of FIG. 10. Referring to FIG. 11, a first substrate 110 is formed on a first carrier substrate 100 through an electrospinning scheme (step S100). The spinning device 10 is filled with the source solution 20, and the first carrier substrate 100 is arranged to face the spinning device 10. A first adhesive layer 105 may be further formed on a surface of the first carrier substrate 100 by coating an adhesive including epoxy, acrylate, etc. on the surface of the first carrier substrate 100 through a printing scheme, a slit coating scheme, a spin coating scheme, a dipping scheme, or a lamination scheme. Then, an electric field is generated between the spinning device 10 and the first carrier substrate 100, and the source solution 20 is sprayed onto the surface of the first carrier substrate 100 by the electric field, thereby forming first nano-fibers 115 (see FIG. 14). Then, after the first nano-fibers 115 are cured, polymer resin is coated on the first nano-fibers 115. Thereafter, a flexible substrate is formed by curing or sintering the polymer resin. According to an embodiment of the present invention, the first substrate 110 is formed through the method of manufacturing the flexible substrate described with reference to FIG. 1.

Figure 12:
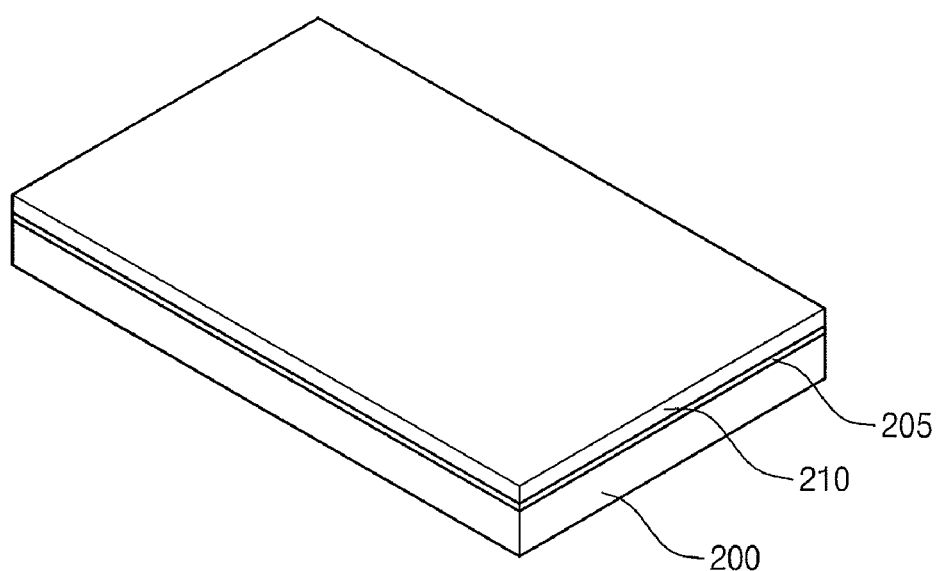

Referring to FIG. 12, a second substrate 210, which includes second nano-fibers, is formed through an electro-spinning scheme and is bonded with a second carrier substrate 200 (step S110). Similar to the first adhesive layer 105, an adhesive is coated on a surface of the second carrier substrate 200, so that a second adhesive layer 205 may be formed. According to an embodiment of the present invention, the second substrate 210 is formed through the same method as that for forming the first substrate 110.

Figure 13:
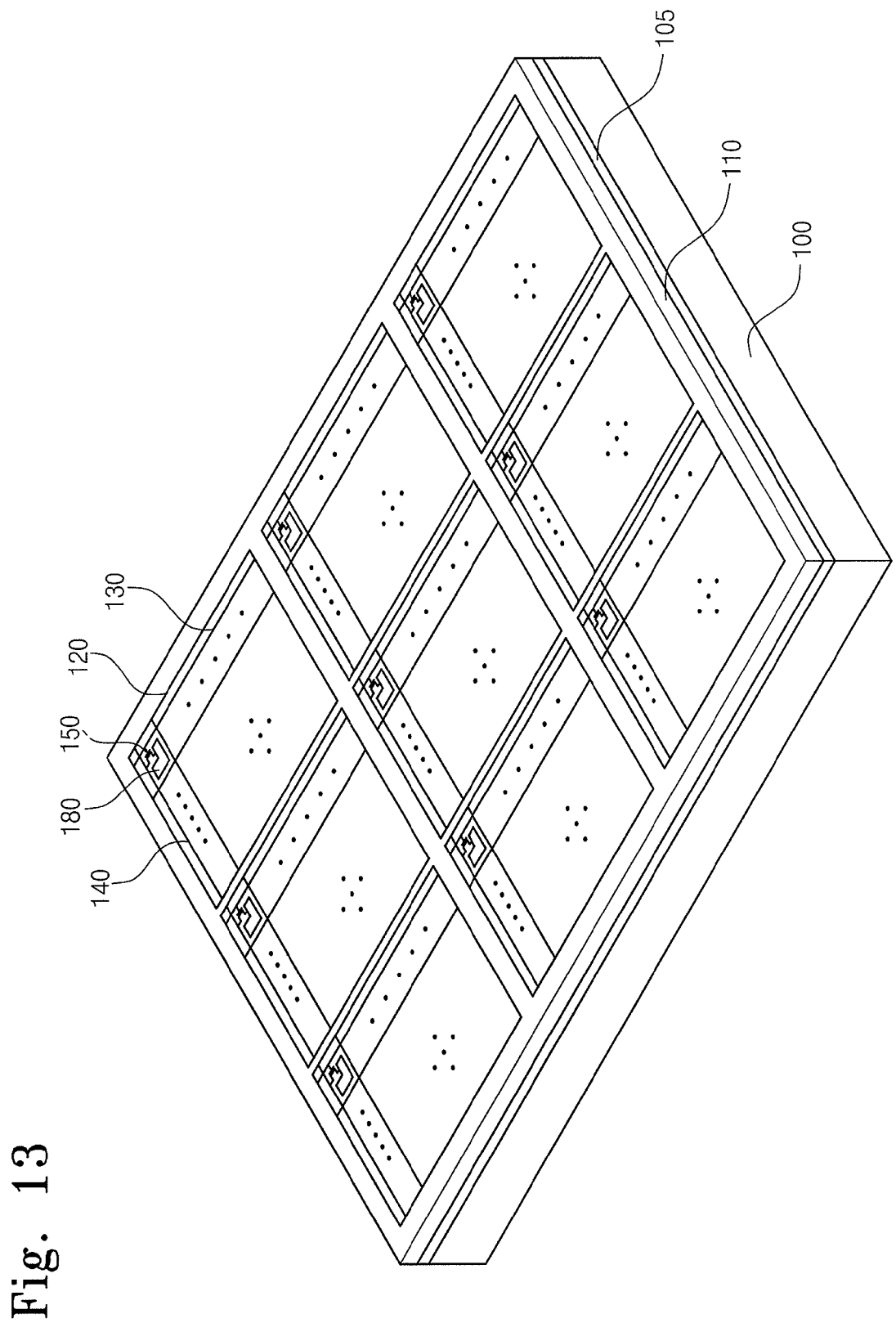
Figure 14:
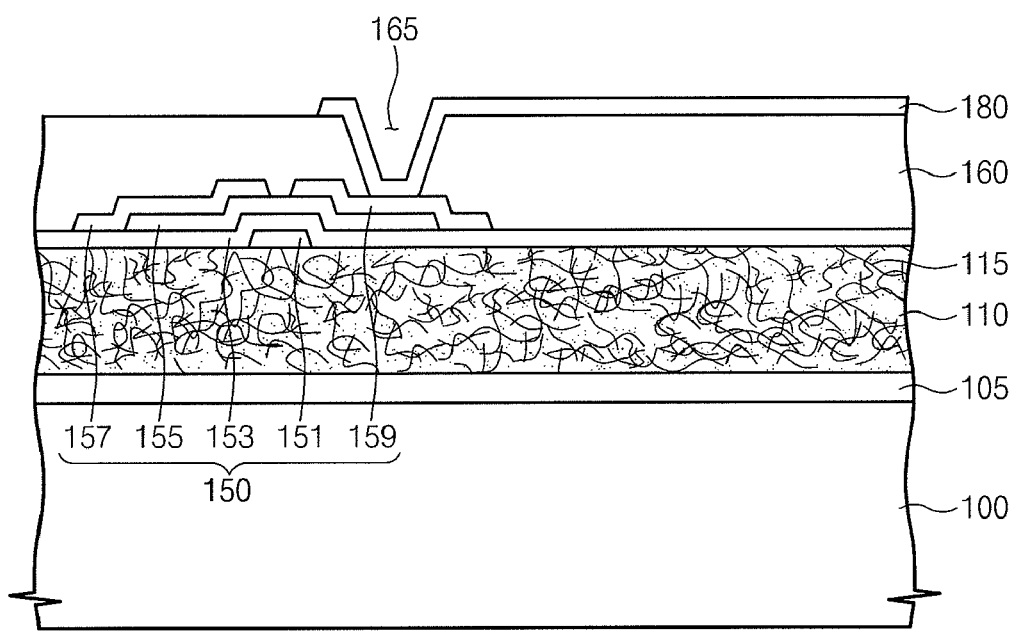

As shown in FIGS. 13 and 14, a thin film transistor 150 is formed on the first substrate 110 (step S120). More specifically, a plurality of first display cells 120 are formed on the first substrate 110 including the first nano-fibers 115. As shown in FIG. 13, the first display cell 120 includes a thin film transistor 150 connected to a gate line 130 and a data line 140, and a pixel electrode 180 connected to the thin film transistor 150. As shown in FIG. 14, the thin film transistor 150 includes a gate electrode 151, an insulating layer 153, a semiconductor layer 155, a source electrode 157, and a drain electrode 159. A process of forming the thin film transistor 150 will be described. After depositing a gate metal on the first substrate 110, the resultant structure is patterned, thereby forming the gate electrode 151. Then, the insulating layer 153 is formed on the first substrate 110 and the gate electrode 151. Subsequently, after depositing a semiconductor material on the insulating layer 153, the resultant structure is patterned, thereby forming the semiconductor layer 155 overlapping with the gate electrode 151. Next, a data metal is deposited on the insulating layer 153 and the semiconductor layer 155, and then the resultant structure is patterned. Accordingly, the source electrode 157, which makes contact with the semiconductor layer 155, and the drain electrode 159, which makes contact with the semiconductor layer 155 while being spaced apart from the source electrode 157, are formed.

The pixel electrode 180 is formed on a protective layer 160. The protective layer 160 protects the thin film transistor 150. A contact hole 165 is formed through the protective layer 160, so that the pixel electrode 180 may be connected to the drain electrode 159.

Figure 15:
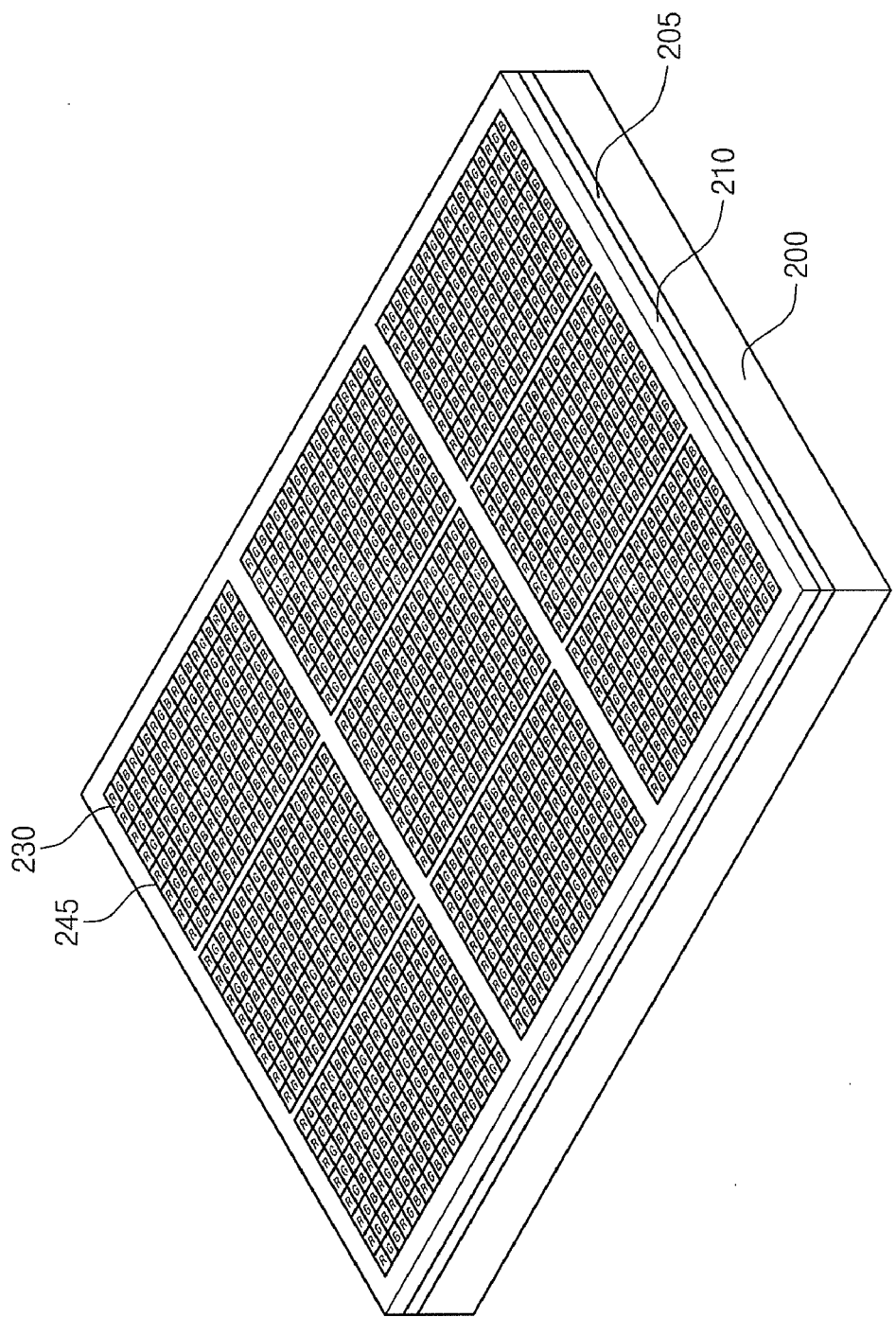
Figure 16:
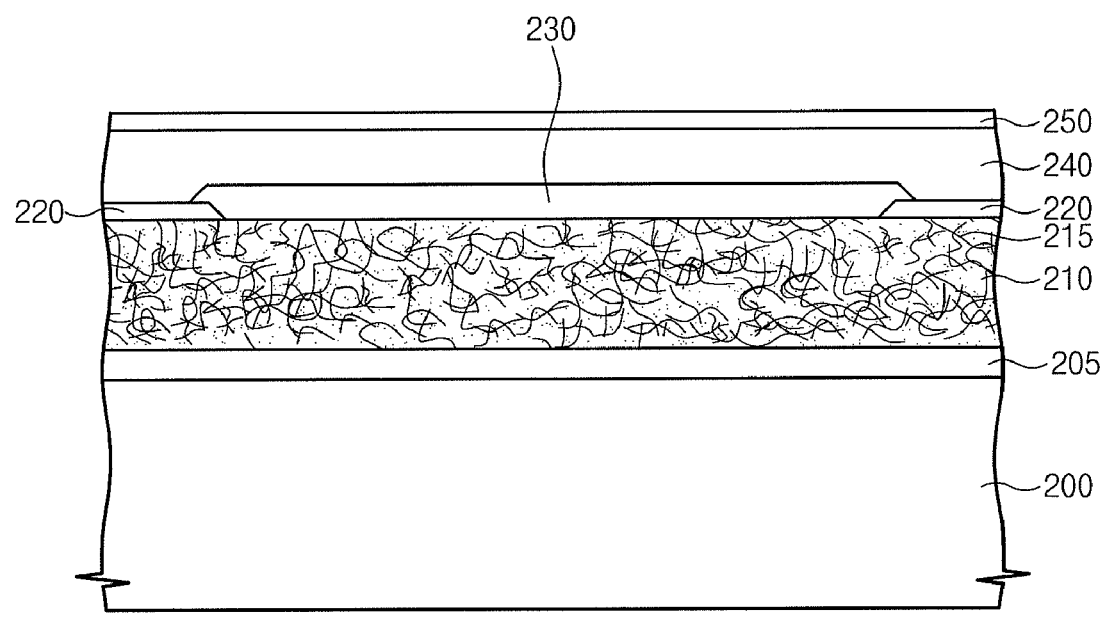

Thereafter, as shown in FIGS. 15 and 16, color filters 230 are formed on the second substrate 210 (step S130). A plurality of second display cells 245 are formed on the second substrate 210, which includes the second nano-fibers 215, corresponding to the first display cells 120. The second display cells 245 include the color filters 230 and a common electrode 250. A process of forming the second display cell 245 will be described. After depositing opaque organic materials or metal on the second substrate 210, the resultant structure is patterned, thereby forming a plurality of black matrices 220. Then, the color filters 230 are interposed between the black matrices 220. Thereafter, a planar layer 240 is formed on the color filters 230 and the black matrices 220 to reduce a step coverage of the color filters 230 and the black matrices 220. Thereafter, the common electrode 250 is formed on the planar layer 240.

Figure 17:
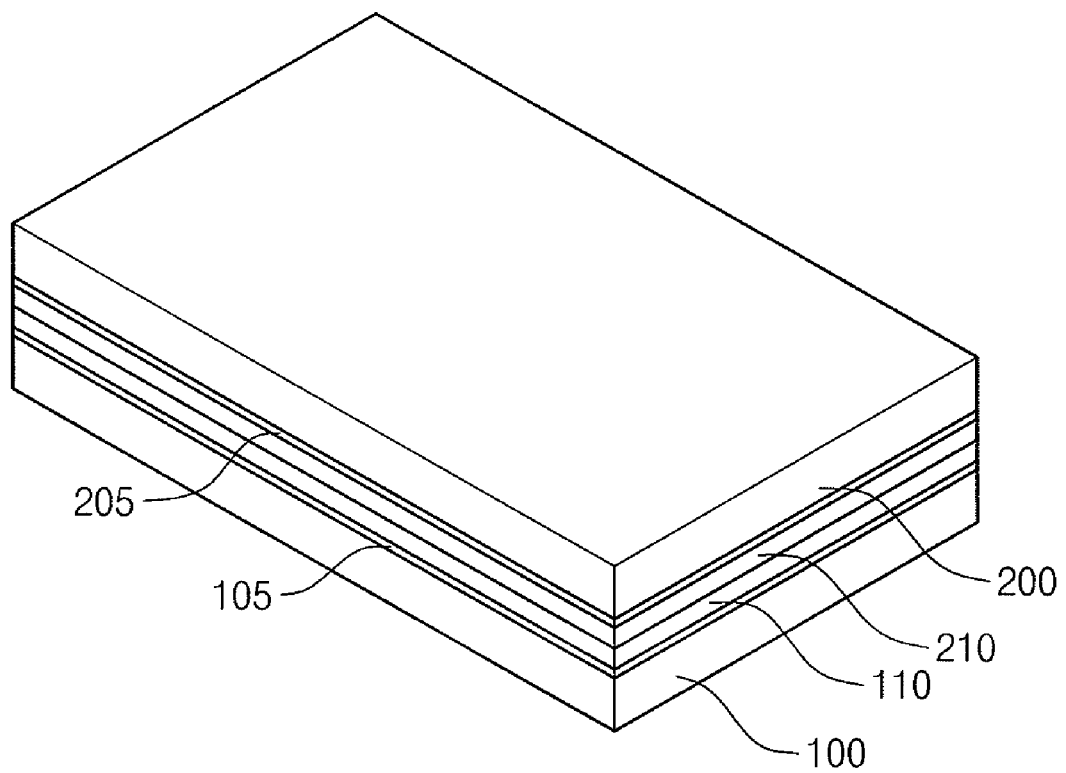
Figure 18:
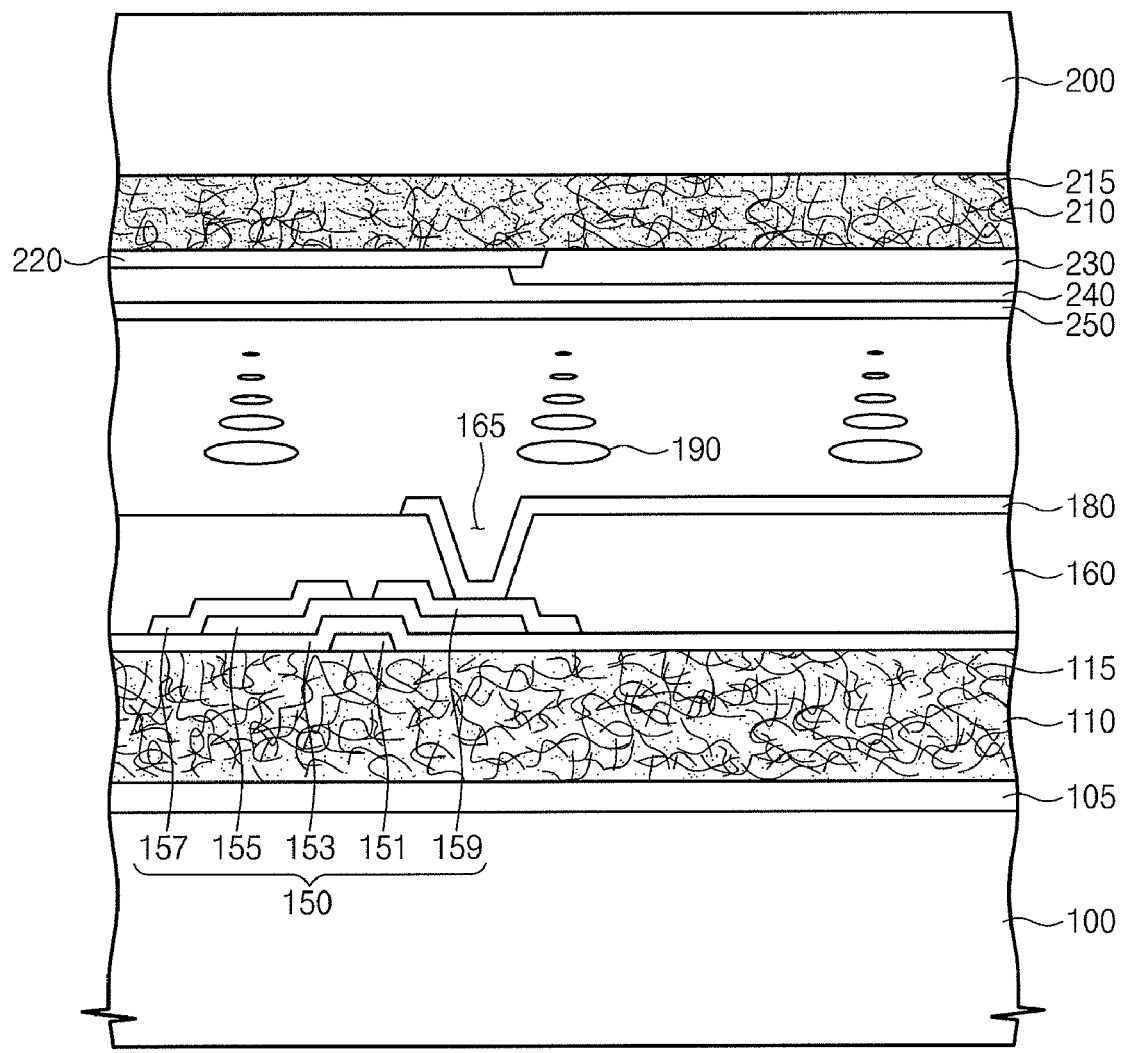

Thereafter, as shown in FIGS. 17 and 18, the first substrate 110 is coupled with the second substrate 210 (step S140). In this case, the first and second substrates 110 and 120 are coupled with each other while interposing liquid crystal 190 therebetween. For example, a sealing line may be formed corresponding to the first display cell 120 of the first substrate 110, and the liquid crystal 190 may be dropped in the sealing line. Then, after the first and second substrates 110 and 210 are aligned, the first substrate 110 is coupled with the second substrate 210. Accordingly, the first display cells 120 are coupled with the second display cells 245 while corresponding to each other. The thin film transistor 150, the pixel electrode 180, the color filter 230, and the common electrode 250 shown in FIG. 18 are identical to those shown in FIGS. 14 and 16.

Figure 19:
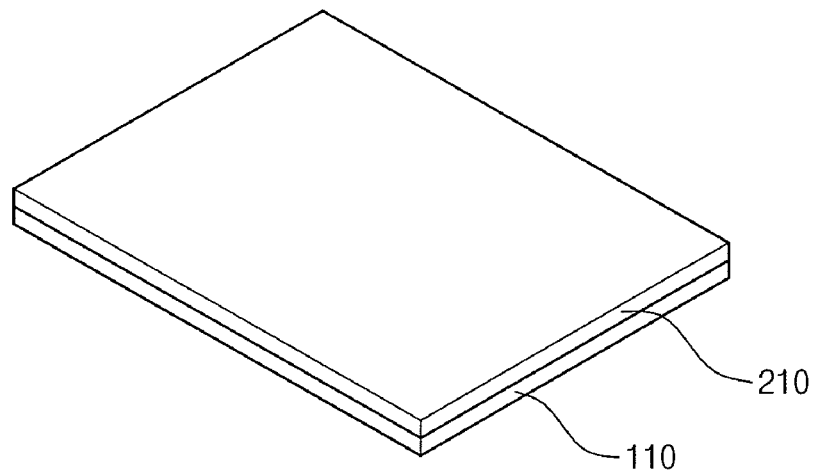

Next, as shown in FIG. 19, the first and second carrier substrates 100 and 200 are separated from the first and second substrates 110 and 210 that have been coupled with each other, thereby forming a display panel 280 (step S150). A laser beam is irradiated onto an interfacial surface between the first substrate 110 and the first carrier substrate 100 to separate the first substrate 110 from the first carrier substrate 100. In addition, the second substrate 210 is separated from the second carrier substrate 200 by irradiating a laser beam onto an interfacial surface between the second substrate 210 and the second carrier substrate 200.

Figure 20:
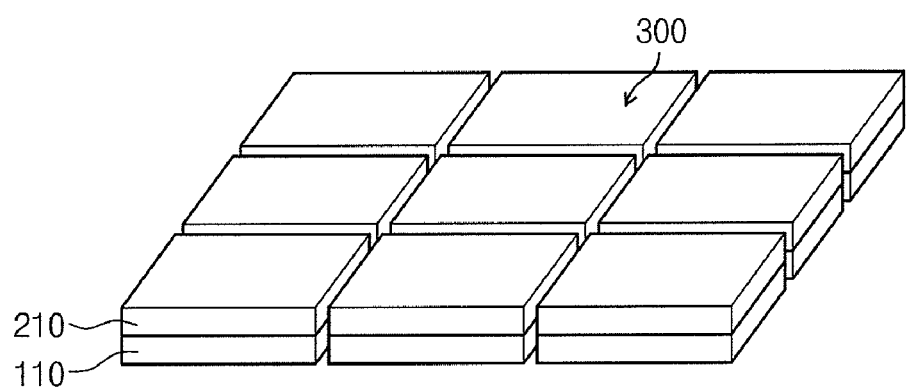
Figure 21:
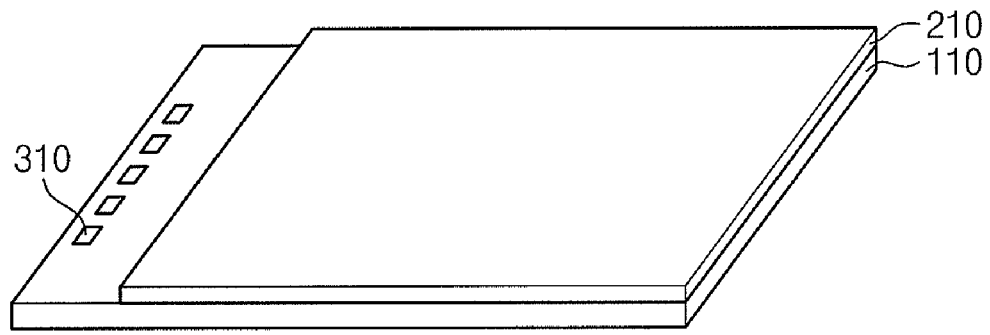

Subsequently, as shown in FIG. 20, the display panel 280 is cut to be divided into a plurality of unit panels 300 (step S160). The display panel 280 may be divided by using a laser or a blade. The display panel 280 may be divided into a plurality of unit panels 300 including the first and second substrates 110 and 210. Thereafter, as shown in FIG. 21, a portion of the second substrate 210 making contact with a connection pad 310 formed at one side of the first substrate 110 is cut away. For example, the portion of the second substrate 210 making contact with the connection pad 310 is cut away by using a laser. The portion of the second substrate 210 is cut away such that the first substrate 110 is not damaged.

Figure 22:
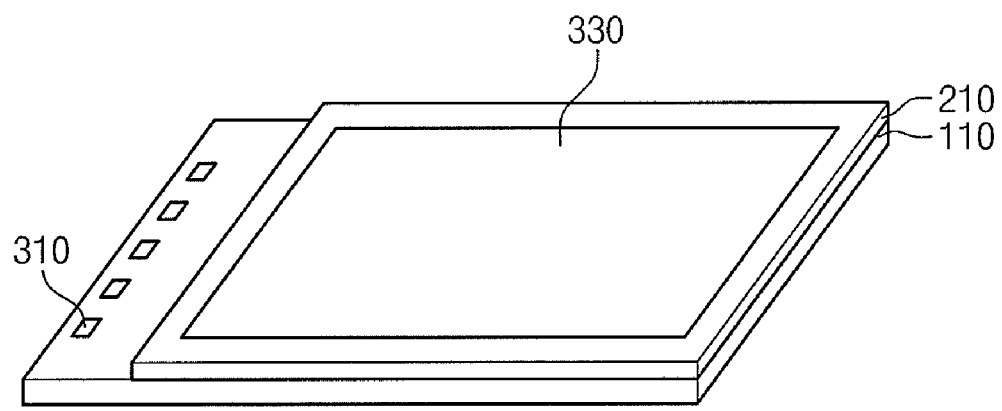

Subsequently, as shown in FIG. 22, a polarizing plate 330 is coupled with the unit panel 300 (step S170). The polarizing plate 330 is coupled with the first and second substrates 110 and 210 of the unit panel 300, respectively.

Figure 23:
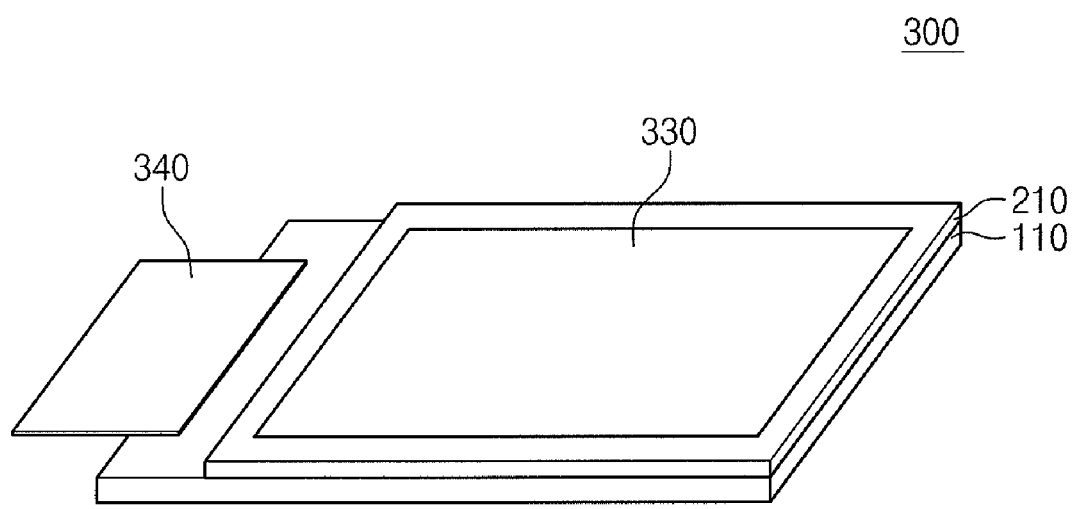

Finally, as shown in FIG. 23, a driving device 340 is coupled with the connection pad 310 (step S180). For example, an anisotropic conductive film (ACF) is bonded with the connection pad 310, and one end of the driving device 340 is aligned with the connection pad 310 such that the driving device 340 can be coupled with the ACF film.

In the method of manufacturing the display panel according to an embodiment of the present invention, the display panel is formed in a size of a mother substrate and then divided into unit panels having a predetermined size in order to improve production efficiency. However, the present invention is not limited thereto, and the display panel may be formed by coupling the first and second substrates having a unit panel size with each other.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of manufacturing a display substrate, the method comprising:
   filling a spinning device with a source solution;
   disposing a carrier substrate such that the spinning device faces the carrier substrate;
   forming an electric field between the spinning device and the carrier substrate;

forming a nano-fiber by spraying the source solution toward the carrier substrate;

forming a flexible substrate on the carrier substrate by coating a polymer resin on the nano-fiber;

forming a plurality of display cells on the flexible substrate; and forming a display substrate by separating the carrier substrate from the flexible substrate.

2. The method of claim 1, further comprising forming an adhesive layer on the carrier substrate.

3. The method of claim 1, wherein the nano-fiber has a shape of a cubic net.

4. The method of claim 1, further comprising supplying power to the spinning device at a voltage level of about 1 KV to about one-hundred thousand KV, and grounding the carrier substrate.

5. The method of claim 4, wherein the spinning device comprises:
a syringe filled with the source solution;
a pressing unit coupled with a first end of the syringe to press the source solution; and
a nozzle coupled with a second end of the syringe through which the source solution flows, and wherein the power is applied via the syringe.

6. The method of claim 1, wherein the source solution is a polymer solution including one of nylon, polyimide, aramide, and polyester.

7. The method of claim 6, further comprising curing the nano-fiber by heating the nano-fiber, after forming the nano-fiber.

8. The method of claim 1, wherein the source solution comprises one of silicon oxide (SiOx) and titanium oxide (TiOx).

9. The method of claim 8, wherein the source solution has one of sol and gel states.

10. The method of claim 8, further comprising:
sintering the nano-fiber by heating the nano-fiber; and
treating a surface of the nano-fiber using siloxane, after forming the nano-fiber.

11. The method of claim 1, wherein forming of flexible substrate further comprises curing the polymer resin.

12. The method of claim 1, wherein the polymer resin comprises one of an epoxy-based material and an acrylic-based material.

13. The method of claim 1, wherein each of the display cells comprises a thin film transistor and a pixel electrode.

14. The method of claim 1, wherein each of the display cells comprises a color filter and a common electrode.

15. The method of claim 1, further comprising forming a plurality of unit display substrates by dividing the display cells, after forming the display substrate.

16. A method of manufacturing a display substrate, the method comprising:
filling a spinning device with a source solution;
disposing a roller such that the roller faces the spinning device;
generating an electric field between the spinning device and the roller;
forming a nano-fiber by rotating the roller and spraying the source solution toward the rotating roller;
forming a flexible substrate on the roller by penetrating the nano-fiber into a polymer resin;
separating the flexible substrate from the roller;
coupling the flexible substrate with a carrier substrate;
forming a plurality of display cells on the flexible substrate; and
forming a display substrate by separating the carrier substrate from the flexible substrate.

17. The method of claim 16, wherein each of the display cells comprises a thin film transistor and a pixel electrode.

18. The method of claim 16, wherein each of the display cells comprises a color filter and a common electrode.

19. The method of claim 16, further comprising forming a plurality of unit display substrates by dividing the display cells, after forming the display substrate.

20. A method of manufacturing a display panel, the method comprising:
preparing first and second substrates bonded with carrier substrates, respectively;
forming a plurality of thin film transistors and a plurality of color filters on the first and second substrates, respectively; and
coupling the first substrate with the second substrate while interposing liquid crystal between the first and second substrates, wherein preparing one of the first and second substrates comprises:
filling a spinning device with a source solution;
disposing a carrier substrate such that the spinning device faces the carrier substrate;
forming an electric field between the spinning device and the carrier substrate;
forming a nano-fiber by spraying the source solution toward the carrier substrate; and
forming a flexible substrate on the carrier substrate by coating a polymer resin on the nano-fiber.

21. The method of claim 20, wherein the nano-fiber has a shape of a cubic net.

22. The method of claim 20, further comprising forming an adhesive layer on the carrier substrate.

23. The method of claim 20, further comprising:
removing the carrier substrate from the flexible substrate;
dividing the first and second substrates into a plurality of unit panels; and
connecting a driving device to the unit panel, after coupling the first substrate with the second substrate.

* * * * *